United States Patent [19]

Pell et al.

[11] 3,757,053

[45] Sept. 4, 1973

[54] TIME MULTIPLEXED SAMPLED DATA TELEPHONE SYSTEM

[75] Inventors: Richard B. Pell, Wantagh, N.Y.; Steven T. Churchill, North Bennington, Vt.; William Seeley, Williamstown, Mass.

[73] Assignee: Delta Communications Corp., Plainview, N.Y.

[22] Filed: Sept. 10, 1971

[21] Appl. No.: 179,344

[52] U.S. Cl. .......... 179/18 J, 179/1 H, 179/15 AL, 179/15 BY, 179/18 B

[51] Int. Cl. .......... H04q 11/00, H04m 3/42

[58] Field of Search .......... 179/15 AL, 15 BM, 179/15 BY, 1 H, 37–40, 18 AD, 2.5 R, 84 SS, 18 B

[56] References Cited

UNITED STATES PATENTS

| | | | |
|---|---|---|---|
| 3,643,030 | 2/1972 | Sparrendahl | 179/15 BA |
| 3,600,519 | 8/1971 | McNeilly et al. | 179/15 AL |
| 3,588,366 | 6/1971 | Formenti et al. | 179/15 BY |
| 3,178,515 | 4/1965 | Bramer et al. | 179/15 BM |
| 3,577,202 | 5/1971 | Brightman | 179/15 A |
| 3,428,754 | 2/1969 | Hoyler et al. | 179/18 BC |
| 3,293,369 | 12/1966 | Schroeder | 179/18 BC |
| 3,274,342 | 9/1966 | Brightman | 179/18 BC |

*Primary Examiner*—Thomas W. Brown
*Attorney*—Breitenfeld & Levine

[57] ABSTRACT

In a telephone system, audio signals to and from each telephone in the system are connected to a time division, amplitude modulated, multiplexed sampled data transmitting and receiving means by a pair of wires. Each telephone in the system may be used to receive paging or music signals, to make a call when it has been called, to intercept a conversation between two other telephones, to forward a call intended for it to another telephone, to complete a call directed to one of a group of telephones with any one telephone in the group which is not busy, and to provide a hands free operation at a called telephone. The various uses are selected by connecting a D.C. voltage, via each pair of wires, to each of the telephones, having the telephones draw currents according to desired modes of operation, and having the time multiplexed transmitter process audio signals according to the currents drawn.

24 Claims, 15 Drawing Figures

INVENTORS:
RICHARD B. PELL
STEVEN T. CHURCHILL
WILLIAM SEELEY
BY Breitenfeld & Levine
ATTORNEYS

INVENTORS:
RICHARD B. PELL
STEVEN T. CHURCHILL
WILLIAM SEELEY

BY Breitenfeld & Levine
ATTORNEYS

INVENTORS:
RICHARD B. PELL
STEVEN T. CHURCHILL
WILLIAM SEELEY
BY Brisebois & Lewis
ATTORNEYS

INVENTORS:
RICHARD B. PELL
STEVEN T. CHURCHILL
WILLIAM SEELEY

BY

Breitenfeld & Levine

ATTORNEYS

INVENTORS:
RICHARD B. PELL
STEVEN T. CHURCHILL
WILLIAM SEELEY

BY

Breitenfeld & Levine
ATTORNEYS

INVENTORS:
RICHARD B. PELL
STEVEN T. CHURCHILL
WILLIAM SEELEY
BY
Breitenfeld & Levine
ATTORNEYS

INVENTORS:
RICHARD B. PELL
STEVEN T. CHURCHILL
WILLIAM SEELEY

BY Breitenfeld & Levine

ATTORNEYS

INVENTORS:
RICHARD B. PELL
STEVEN T. CHURCHILL
WILLIAM SEELEY

BY Breitenfeld & Levine

ATTORNEYS

INVENTORS:
RICHARD B. PELL
STEVEN T. CHURCHILL
WILLIAM SEELEY
BY Breitenfeld & Levine
ATTORNEYS

TIME MULTIPLEXED SAMPLED DATA TELEPHONE SYSTEM

BACKGROUND OF THE INVENTION

1. Field of the Invention

The subject invention relates to communications systems and in particular to a telephone communications system wherein the system telephones are connected to a time multiplex transmitter by a single pair of wires.

2. Description of the Prior Art

Existing telephone systems have conference call capabilities, call transfer capabilities, call intercept capabilities, "hands free" operation capabilities, call forward capacilities, ring-out capabilities, group hunt capabilities and indicator lights.

However, telephone systems having all of the capabilities mentioned above which accommodate 20 or fewer telephones require that many wires be connected to each telephone from a central station. In telephone systems having a greater telephone capacity, it has been necessary to install expensive banks of automatic or semiautomatic switching devices of either the so-called step-by-step or cross bar types. Moreover, in these systems, some of the functions above described are only available with the aid of a switchboard and an operator.

SUMMARY OF THE INVENTION

Accordingly, it is an object of this invention to provide an improved time-multiplexed sampled data telephone system.

It is another object of this invention to provide a telephone system wherein a called telephone can add another telephone to the conversation without the assistance of an operator.

It is a further object of this invention to provide a telephone system wherein calls to any one telephone may, automatically, be transferred to another telephone without the assistance of an operator.

It is another object of this invention to provide a telephone system wherein calls to a particular telephone may be intercepted by another telephone without the assistance of an operator.

It is an additional object of this invention to provide a telephone system wherein all telephones may be used simultaneously.

It is another object of this invention to provide a telephone system wherein each telephone provides music or a public address.

It is a further object of this invention to provide a telephone system wherein a called telephone may be answered without the need to lift or hold the handset of the called telephone.

It is still another object of this invention to provide a telephone system wherein a calling telephone is automatically disconnected within a predetermined time after a called party hangs up his telephone, or within a predetermined time if a called telephone is unanswered.

It is yet another object of this invention to provide a telephone system wherein a call to any one of a group of associated telephones will be completed with an available telephone in the group.

It is a further object of this invention to provide a telephone system wherein telephones in the system include a bulb which lights up when its associated telephone rings.

It is also an object of this invention to provide a telephone system wherein each telephone in the system is connected to the rest of the system by a single pair of wires.

The system of the present invention has all these capabilities although each telephone is connected to a central station by only two wires, because the central station includes a time division, amplitude modulated, multiplexed transmitting and receiving means, which is described below.

BRIEF DESCRIPTION OF THE DRAWINGS

The above mentioned and other objects of this invention will become apparent by reference to the following description which is to be read, in conjunction with the accompanying drawings, wherein.

The complex system to be described as an embodiment of the invention utilizes many sybsystems, only some of which deserve attention herein. Accordingly, the subsystems will first be described functionally with respect to the various operational modes of the system and then, where not obvious to one having ordinary skill in the art, with respect to how they achieve their function.

Figure 1:
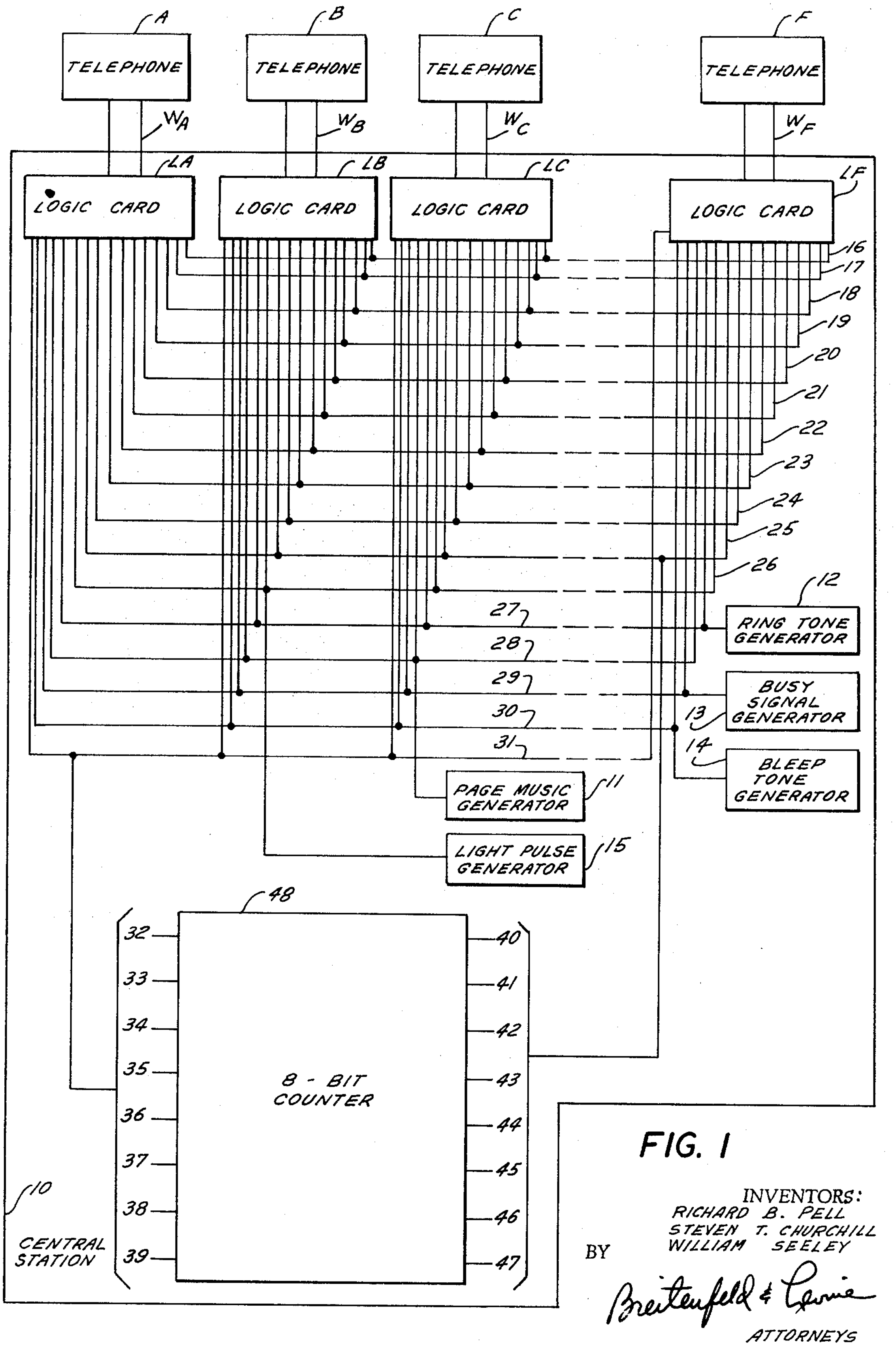
FIG. 1 is a block diagram of a telephone system according to the invention.

Referring to FIG. 1, in a 100 telephone system, 100 telephones A,B,C, . . . F, (all not shown) are each connected, respectively, to 100 corresponding logic cards $L_A$, $L_B$, $L_C$ . . . $L_F$, located at a central station 10, in the form of a time multiplexed transmitter, by 100 pairs of telephone wires, $W_A$, $W_B$, $W_C$ . . . $W_F$. At the central station 10, there is connected to each logic card a bleep tone generator 14 via line 30, a page-music generator 11 via line 28, a ring tone generator 12 via line 27, light-pulse generator 15 via line 26, a busy signal generator 13 via line 29, a common talk line 16, a common talk line 17, a ring control line 18, a privacy line 19, a privacy line 20, a ring disable line 21, a stepping line 22, a hold line 23, a push-to-talk line 24 and the 16 output lines 32 thru 47 of an 8-bit counter 48 which includes a clock. The output signals of lines 40 through 47 respectively, are the logic complements of the output signals on lines 32 through 39.

The 8-bit counter 48 provides periodically, in binary form, numbers N which range from 1 to 100 at a rate equal to the frequency of the 8-bit counter clock divided by 100. Each binary number corresponding to a number N appears during a particular time interval of the periodic 8-bit counter cycle and is used to identify a periodic time interval. The defined periodic time intervals are used in the system to identify each system telephone, for connecting one telephone to another, and to provide timing signals for a time multiplexed sampled-data arrangement which is used to transmit audio signals from one telephone to another.

Referring to FIGS. 1, 2, 3, and 4, each of the 100 telephones in the system is assigned one of the numbers N, from 1 to 100, which corresponds to a binary count in the 8-bit counter 48 and each logic card includes a fixed time slot decoder (such as 101 and 201 in logic cards $L_A$ and $L_B$) which is programmed in accordance with its assigned binary number, to produce pulses periodically in its related time slot. The pulses on each logic card comprise a periodic signal, herein referred to as $T_N$, as shown in FIG. 2*a*.

Figure 3:
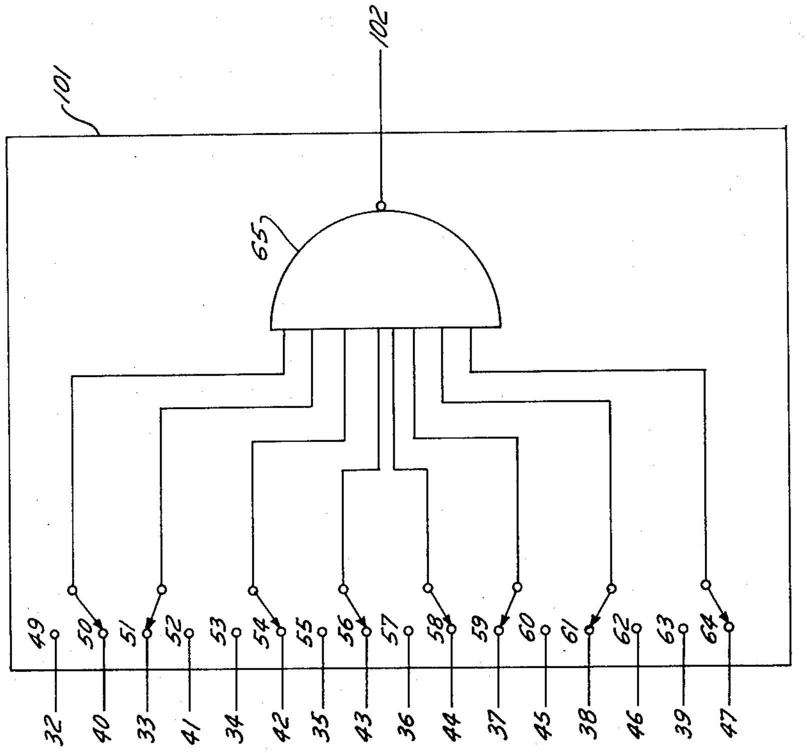
FIG. 3 is a schematic diagram of a subsystem according to the invention.
Figure 2:
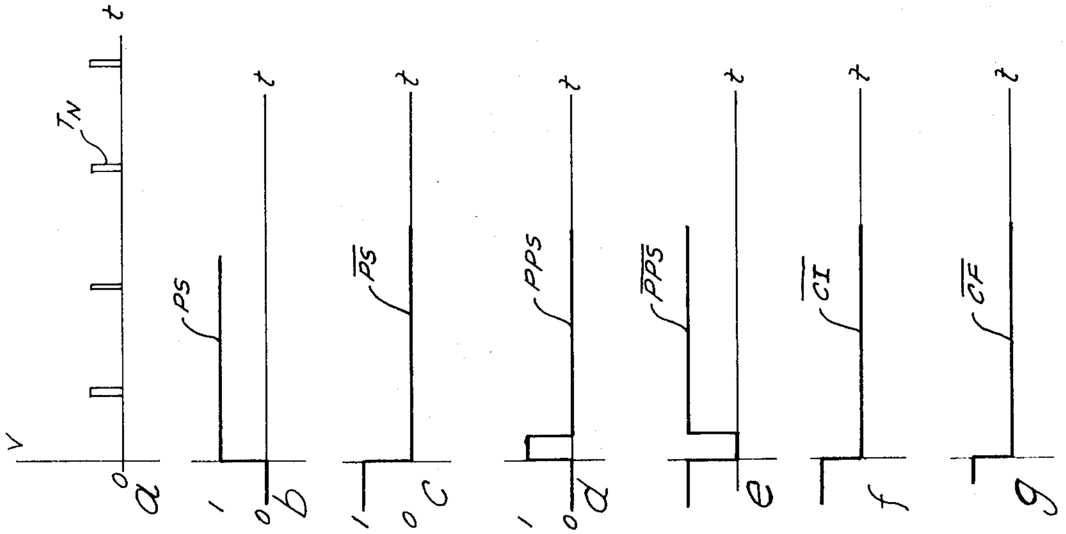
FIG. 2 illustrates voltage waveforms associated with the telephone system according to the invention.

Referring to FIG. 3, the periodic signal, is achieved for example, on logic card $L_A$, which is assigned number 46, by connecting the 16 outputs 32 through 47 of the 8-bit counter 48, respectively, to input terminals 49 through 64 on fixed time slot decoder 101 and connecting the 8 inputs of the AND gate 65 to those terminals which are at a logic 1 level when binary number 46 is present in binary form (01000110) at the 8-bit counter 48. As is well known, this arrangement provides an output pulse only when the binary number 46 is present and, where as here, when the binary number is periodically applied, a periodic pulse signal $T_{46}$ is provided.

How the $T_N$ signals are processed by the respective logic cards in the system will be described herein below in connection with FIG. 4, which shows in block diagram form the subsystems located on logic cards $L_A$, $L_B$, used when a direct call is made from telephone A to telephone B. Telephone A and Telephone B have, respectively, assigned numbers 46 and 26.

Figure 4:
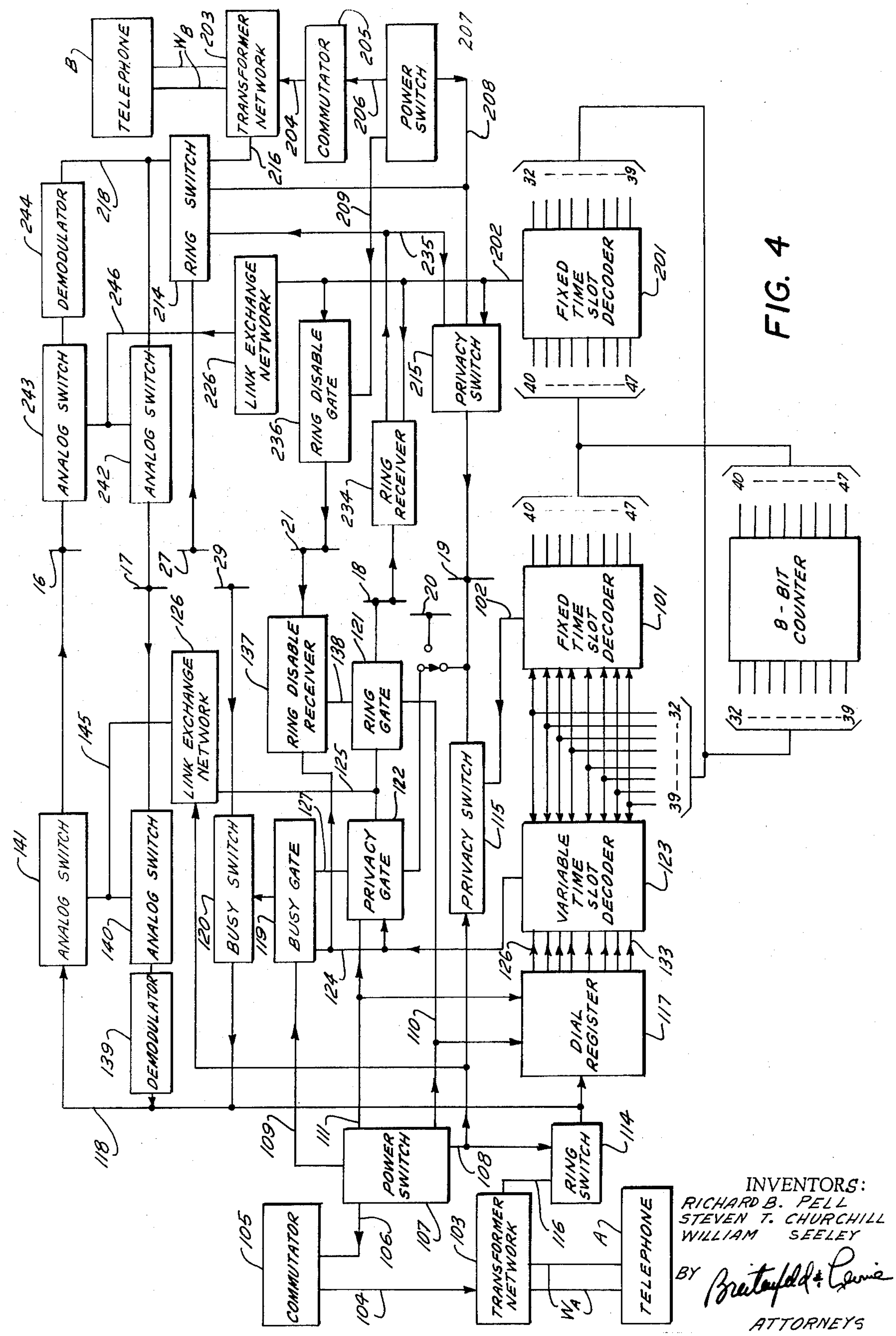
FIG. 4 is a block diagram of subsystems used according to the invention when Telephone A calls Telephone B.

Referring to FIG. 4, Telephone A includes an audio transformer (not shown) whose secondary winding is connected by wires $W_A$ to the primary winding (not shown) of a transformer in transformer network 103. A D.C. voltage from power switch 107 is connected by wire 106 to commutator 105 (hereinafter described) and by wire 104 to the primary winding of the transformer in the transformer network 103 to supply DC current to Telephone A. Telephone A includes a dialing arrangement and special system function switches (not shown) for "call forward" and "call intercept" modes of operation, hereinafter described, when when operated cause the D.C. current being delivered to Telephone A to change by detectable amounts. For example, when the Telephone A handset is in its cradle zero ma flow; when the handset is lifted from the cradle a hook switch (not shown) is closed and 46 ma flow; when the "call intercept" switch is closed, 62 ma flow; and when the call forward switch is closed, more than 100 ma flow. The power switch 107 senses the current being drawn and provides output voltages which the logic card $L_A$ requires in order to operate in the desired mode.

When the handset of Telephone A is picked up to make a call at time $t=0$, the hook switch closes and power switch 107 senses that 46 ma are being drawn. In response, the power switch provides voltages, as shown in FIGS. 2*b*, *c*, *d*, and *e*, PS, $\overline{PS}$, PPS, and $\overline{PPS}$, respectively, over lines 108, 109, 110, and 111 to subsystems on logic card $L_A$.

Line 108 is connected to ring switch 114, an electrically controlled on-off switch, and to privacy switch 115, a circuit which permits or blocks the passage of signal $T_{46}$, generated by the fixed time slot decoder 101, on to the privacy line 19. Voltage PS closes the ring switch 114 and causes the privacy switch 115 to block signal $T_{46}$ when the handset of Telephone A is lifted. Further, when the handset is lifted, the ring switch 114 is closed, and it connects the transformer network 103, via line 116, to the dial register 117, a circuit which stores dialed pulses in binary form, and to the audio line 118.

Line 109 is connected to busy gate 119, a circuit which activates an electrical busy switch 120. Busy switch 120 couples a busy tone on line 29 to audio line 118 when the called telephone is busy. Voltage $\overline{PS}$ disables the busy gate 119 when Telephone A is not in use.

Line 110 is connected to ring gate 121, a circuit which permits or blocks the passage of a signal to ring control line 18 for causing Telephone B to ring, and to the dial register 117. The voltage PPS on line 110 enables the ring gate 121 and clears the dial register 117 when the handset of Telephone A is lifted.

Line 111 is connected to privacy gate 122, a circuit which generally compares periodic pulse signals from privacy line 19 with a periodic signal on line 124 from variable time slot decoder 123. The privacy gate 122 provides, when there is coincidence, between the signals on line 19 and 124 a periodic signal $V'_{26}$ on line 125 which is connected to ring gate 121 and link exchange network 126; and a signal which is connected via line 127 to busy gate 119 for diabling the busy switch 120. The voltage $\overline{PPS}$ disables the privacy gate 122 when the handset of Telephone A is lifted. Line 111 is also connected to dial register 117 and clears it when the handset of Telephone A is returned to its cradle.

When the number (26) of Telephone B is dialed on Telephone A, it provides, sequentially, a pair of pulses which represent the number 2 and a set of 6 pulses which represent the number 6. The pulses from Telephone A are transmitted via wires $W_A$ to the transformer network 103 and to the dial register 117 via ring switch 114 which was closed by voltage PS. The dial register counts the pulses, stores them as binary number 26 (00100110) and provides this binary number over lines 126 through 133 to variable time slot decoder 123 which also receives, over lines 32 through 39, from the 8-bit counter 48, binary numbers ranging from 1 to 100. The variable time slot decoder 123 compares its two sets of binary inputs and provides a pulse whenever there is coincidence. Since the output of the 8-bit counter 48 is periodic, the resulting signal from the variable time-slot decoder 123 is a periodic pulse signal $V_{26}$ which is substantially similar to periodic pulse signal $T_{26}$ provided by the fixed time slot decoder 201 on logic card $L_B$.

The $V_{26}$ signal from the variable time-slot decoder 123 is connected by wire 124 to the privacy gate 122 and to the busy gate 119 which in turn closes the busy switch 120 thereby coupling a busy tone from the busy signal generator 13 to audio line 118. The busy tone on the audio line 118 travels through the ring switch 114 and transformer network 103 to Telephone A where a busy tone is heard.

If Telephone B is not busy, the $T_{26}$ signal which logic card $L_B$ generates, is present on the privacy line 19 and at the privacy gate 122. Privacy gate 122 is enabled when $V_{26} \cong T_{26}$ and provides, over line 127, a signal which overrides the $V_{26}$ enabling signal over line 124 to the busy gate 119, thereby leaving busy switch 120 open. Privacy gate 122 also provides a periodic pulse signal $V'_{26}$ which is substantially similar to $V_{26}$ and is connected by line 125 to ring gate 121. Ring gate 121 which was enabled by voltage PPS on line 110 couples the $V'_{26}$ signal to ring control line 18.

Ring control line 18 and the fixed time slot decoder 201 on logic card $L_B$ are connected to ring receiver 234. The presence at the ring receiver 234 of signals $V'_{26}$ and $T_{26}$ causes a DC signal (0 logic level) to be transmitted over line 235 to ring switch 214 and privacy switch 215. The DC signal at ring switch 214 causes the ring line 27 to be connected to the transformer network 203 and disables the privacy switch 215.

When ring switch 214 is closed by the DC level, ring tone on line 27 from the ring tone generator 12, as shown in FIG. 1, is coupled via ring switch 214 to the transformer network 203 and from there via wires $W_B$, to Telephone B. The ring tone causes Telephone B to ring, thereby announcing the presence of an incoming call. The DC level connected to the privacy switch 215 via line 235 deprives the privacy line 19 of signal $T_{26}$ and thereby indicates to the system that Telephone B is busy.

If the handset of Telephone B is picked up, as with Telephone A, the power switch 207 provides PS and $\overline{PS}$ voltages over lines 208 and 209, respectively. Line 209 is connected to ring disable gate 236, an electronic on-off switch which is turned on by voltage PS. When the ring disable gate 236 is turned on, signal $T_{26}$, which is coupled thereto by line 202 from the fixed time slot decoder 201, is connected to the ring disable line 21. The ring disable receiver 137 on logic card $L_A$ is connected to the ring disable line 21, and to the variable time slot decoder 123 by line 124. The simultaneous presence of both the $V_{26}$ signal from the variable time slot decoder 123 and the similar signal $T_{26}$ from the ring disable line 21 causes the ring disable receiver 137 to provide a signal to line 138 which disables the ring gate 121. When the ring gate 121 is disabled, signal $V'_{26}$ does not reach the ring control line 18, the DC level at the ring receiver 234 drops, the ring tone is disconnected and Telephone B stops ringing. Line 208 connects voltage PS to privacy switch 215 when the handset of Telephone B is picked up and maintains the privacy switch 215 in the disabled state when the DC level drops, thereby continuing the "in use" message to the system.

Line 208 also connects the power switch 207 to ring switch 214 and voltage PS causes the ring switch 214 to connect line 216 to line 218 which carries audio signals.

When a person talking on Telephone A speaks, the audio signal generated at the Telephone A is coupled via transformer network 103 and ring switch 114 to analog switch 141. Analog switch 141 only allows the audio signal to pass through the analog switch 141 when pulses from the privacy gate 122 are connected thereto by line 125, link exchange network 126, and line 145. These pulses are provided by signal $V'_{26}$; therefore, the output of the analog switch 141 is a pulse amplitude modulated signal, whose pulses occur in time slot 26. The modulated pulses are connected to the audio line 16. Line 16 is connected to analog switch 243 which is opened periodically by signal $T'_{26}$ connected thereto by line 202, link exchange network 226, and line 246 from the fixed time slot decoder 201. Since pulses from signals $V'_{26}$ and $T_{26}$ occur at the same time, the analog switch 243 only passes the pulse amplitude signal generated at logic card $L_A$. The output of the analog switch 243 is connected to a demodulator 244 which reproduces the audio signal from Telephone A. The audio signal is coupled to Telephone B by ring switch 214, and transformer network 203.

When a person talking on Telephone B replies, the reply audio signal generated at Telephone B is coupled via transformer network 203 and ring switch 214 to analog switch 242; analog switch 242 only allows the reply audio signal to pass through the switch when pulses from the signal $T_{26}$ are coupled thereto on line 246. Therefore, the output to line 17 of analog switch 242 is a pulse amplitude modulated signal. The common talk line 17 is connected to analog switch 140 which is periodically opened by the pulses from signal $V'_{26}$ and allows the pulse amplitude signal through. The pulse amplitude signal at the output of the analog switch 140 is connected to demodulator 139 which reproduces the audio reply signal. The audio reply signal is connected to Telephone A via the ring switch 114 and transformer network 103.

Figure 5:
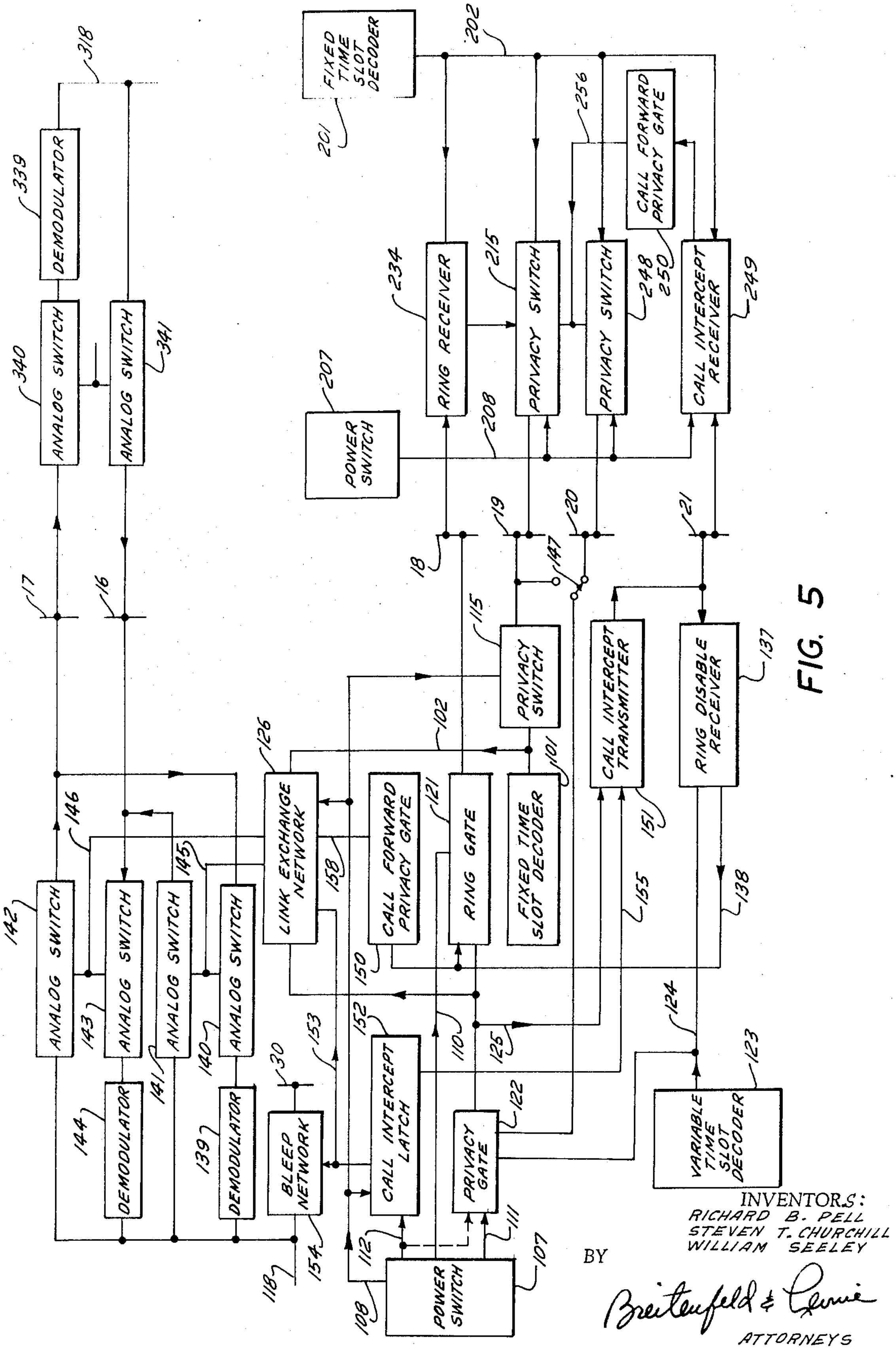
FIG. 5 is a block diagram of subsystems used according to the invention when Telephone A intercepts an existing conversation.

Referring to FIG. 5, logic card $L_A$ also includes an analog switch 142 coupling the audio line 118 to common talk line 17, a demodulator 144 coupled to the audio line 118, and an analog switch 143 coupling the common talk line 17 to the demodulator 144. Analog switches 142 and 143 are connected to link exchange network 126 by line 146. The link exchange network normally couples the periodic signal $T_{46}$ on line 102 from the fixed time slot decoder 101 to line 146.

Any telephone in the system can be provided with the capability of intercepting telephone calls made to another telephone. This "call intercept" function is provided on Telephone A by connecting switch 147 to privacy line 20. With this connection, if Telephone C calls Telephone B, periodic signal $V'_{26}$ from Telephone C causes Telephone B to ring and causes privacy switch 215 to deprive privacy line 19 of signal $T_{26}$. However, privacy switch 248 couples signals $T_{26}$ to privacy line 20 which is connected via switch 147 to privacy gate 122. Thus, if the handset of Telephone A is picked up and Telephone B is dialed, signal $V'_{26}$ will be provided by privacy gate 122 to ring gate 121 and to call intercept transmitter 151, a DC controlled switch, by line 125. Signal $V'_{26}$ is not transmitted by the call intercept transmitter 151 until the call intercept button on Telephone B (not shown) is depressed thereby enabling the call intercept latch 152 which controls said intercept transmitter 151.

The call intercept latch 152, a slip-flop circuit, is disabled when the handset of Telephone A is removed from its cradle and voltage PS, which is connected thereto from power switch 107 by line 108, is applied; and is enabled by voltage $\overline{CI}$, shown in FIG. 2*f*, connected thereto from the power switch 107 over line 112 when the call intercept button is depressed.

One output of the call intercept latch 152 is connected by line 153 to the link exchange network 126 and to bleep network 154. In response to the $\overline{CI}$ voltage, the link exchange network, hereinafter described, disconnects signal on line 102 from line 146 and connects signal on line 125 to line 146. In addition, the bleep network 154, a momentary switch, connects the bleep line 30, which provides an audio tone, to the audio line 118. The audio tone is heard at Telephone A and C and provides an indication that the call from Telephone C has been intercepted.

The other output of the call intercept latch 152 is connected to the call intercept transmitter by line 155 and provides thereto a DC voltage (a logic 1) when the call intercept latch 152 is enabled by voltage $\overline{CI}$.

The DC voltage causes the call intercept transmitter to couple the signal $V'_{26}$ to the ring disable line 21 and to ring disable receiver 137. Signal $V'_{26}$ on the ring disable line 21 causes the ring disable receiver 137 to disable the ring gate 121 on logic card $L_A$ and the corresponding ring gate (not shown) on logic card $L_C$, thereby causing Telephone B to stop ringing.

The call intercept receiver 249 receives signal $V'_{26}$ from the ring disable line 21, signal $T_{26}$ over line 202 from the fixed time slot decoder 201, and disabling voltage PS over line 208 from the power switch 207. So long as the handset of Telephone B is in its cradle and signals $V'_{26}$ and $T_{26}$ are present, the call intercept receiver 249 provides a pulse signal to call forward privacy gate 250, which is an intergrator, and said gate provides over line 256 a DC voltage (a logic 1) which disables privacy switch 215 and privacy switch 248. The disabled privacy switches deprive privacy lines 19 and 20 of signal $T_{26}$ and therefore indicates to the system that Telephone B is in use.

After the foregoing events related to the "call intercept" function have occured, the party at Telephone C can talk with the party at Telephone A even though he dialed Telephone B.

If it is desired to provide Telephone A with the capability of interrupting a telephone conersation between two other telephones in the system (Executive override), this can be achieved by modifying its logic card, $L_A$, as shown by the dotted line in FIG. 5, so as to connect line 112 to privacy gate 122. Thus, when the call intercept button is depressed, voltage $\overline{CI}$ enables the privacy gate 122, regardless of whether privacy lines 19 or 20 are providing pulses from the telephone called. In this mode of operation, line 138 from the ring disable receiver is connected to call forward privacy gate 150 and causes the gate to provide a DC signal over line 158 to the link exchange network 126. This DC signal prevents the line switching which would have taken place in response to the application of voltage $\overline{CI}$ to the call intercept latch 152. Thereafter, the party on Telephone A can talk to both parties involved in the preexisting call.

Figure 6:
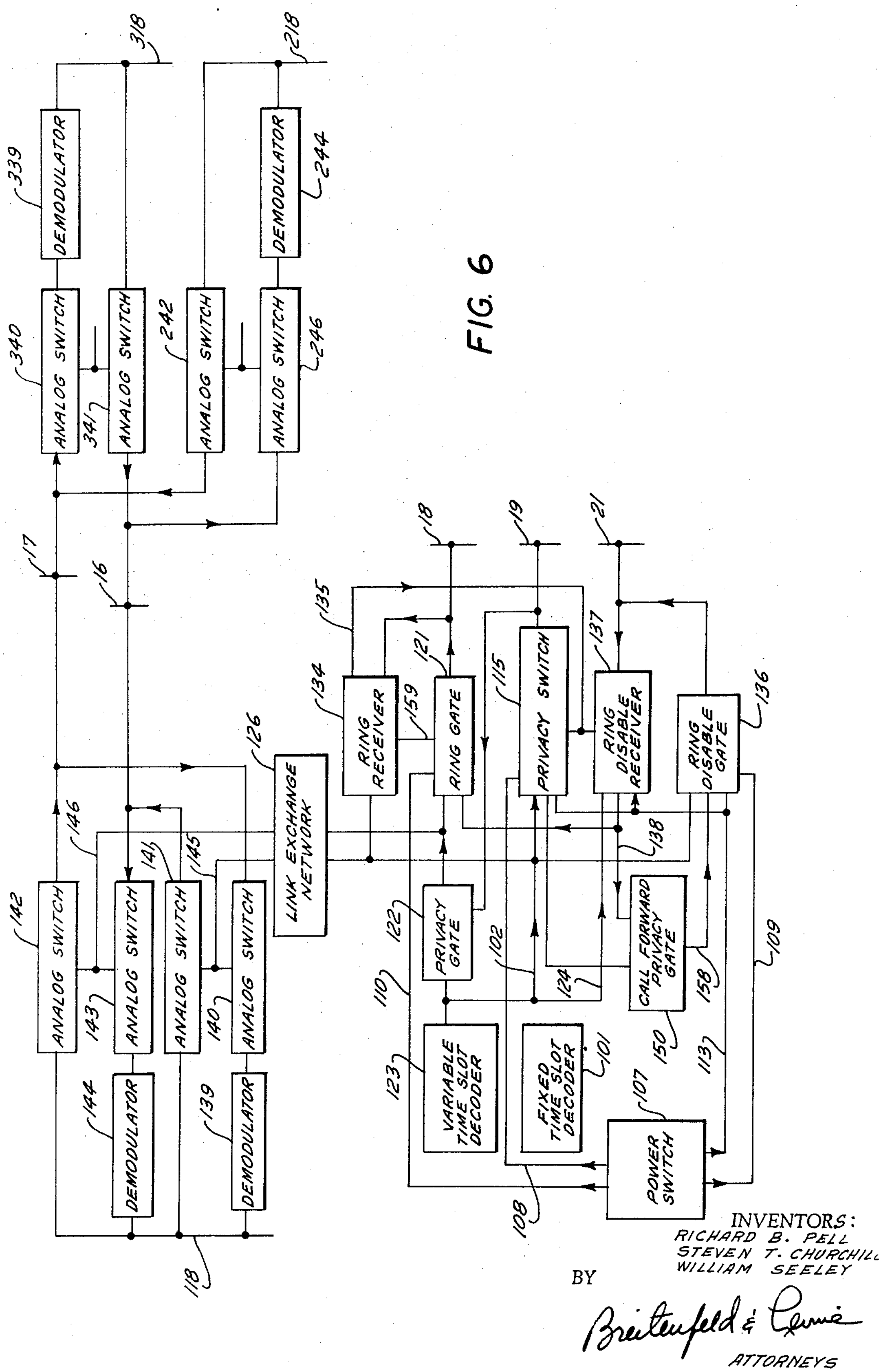
FIG. 6 is a block diagram of subsystems used according to the invention when Telephone A forwards calls to it to another telephone.

Referring to FIG. 6, if the party having Telephone A wishes to have calls made to him transferred, for example, to Telephone B, this can be achieved by his picking up the handset, dialing Telephone B's number and depressing the call forward button (A locking switch-not shown) on Telephone A.

As previously described, when the handset of telephone A is removed from its cradle, line 108 from power switch 107 connects voltage $\overline{PS}$ to privacy switch 115 thereby disconnecting signal $T_{46}$ from privacy line 19. Line 109 from power switch 107 connects voltages PS to ring disable gate 136 thereby allowing signal $T_{46}$ to be coupled to the ring disable line 21 to terminate the ringing of Telephone A if it had been called.

However, depression of the call forward button after Telephone B has been dialed causes a voltage $\overline{CF}$, shown in FIG. 2g, to be connected via line 113 to privacy switch 115 and ring disable gate 136 thereby connecting signal $T_{46}$ to the privacy line 19 and disconnecting signal $T_{46}$ from the ring disable line 21 thus making it appear to the other telephones in the system that the handset of Telephone A is in its cradle. In addition, line 113 connects voltage $\overline{CF}$ to ring disable receiver 137 which in turn provides a signal to the ring gate 121 so as to terminate ringing at Telephone B.

If, for example, a party dials Telephone A from Telephone C, signal $V'_{46}$ is placed on to ring control line 18 and ring receiver 134. Ring receiver 134 is connected by line 159 to ring gate 121 and by line 135 to privacy switch 115. So long as signal $V'_{46}$ is connected to the ring receiver 134, its outputs enable the ring gate 121 thereby connecting $V'_{26}$ pulses to the ring control line 18 which cause Telephone B to ring and the privacy switch 115 is disabled thereby preventing signal $T_{46}$ from being coupled to privacy line 19 and causing Telephone A to look busy to the rest of the system.

If the handset of Telephone B is picked up, signal $T_{26}$ is placed on the ring disable line 21 by Telephone,B, and the ring disable receiver 137 which is also connected to the ring disable line 21. The ring disable receiver 137 in response to signals $T_{26}$ and $V'_{26}$, which is connected thereto by line 124, provides a signal on line 138, which disables ring gate 121 and causes Telephone C to stop ringing. In addition, the ring disable receiver 137 causes call forward privacy gate 150 to send out a signal on line 156, which also disables privacy switch 115, and a signal on line 158, which enables the ring disable gate 136. When the ring disable gate 136 is enabled, signal $T_{46}$ is coupled to ring disable line 21 and Telephone C stops providing signal $V'_{46}$ on ring control line 18. The absence of signal $V'_{46}$ at the ring receiver 134 causes Telephone A to stop ringing and the output on line 135 to drop to zero. This does not affect the state of the privacy switch 115 but does cause the ring disable receiver 137 to provide a signal on line 138 which disables the ring gate 121.

Under the circumstances just described, Telephone A will appear to be busy to the rest of the system. Audio signals from the Telephone C will be modulated by $V'_{46}$ on logic card $L_C$ and transmitted to logic card $L_A$. Logic card $L_A$ will demodulate the incoming signal and use the recovered audio to modulate signal $V'_{26}$, and the resulting signal is transmitted to logic card $L_B$ where the audio signal originating at logic card $L_C$ is recovered and transmitted to Telephone C. Return audio signals from Telephone B are similarly returned via Telephone A to Telephone C.

If a party on Telephone C calls a party at Telephone A, audio signals are modulated by analog switch 142 and reply audio signals from Telephone C are selected by analog switch 143 for demodulation by demodulator 144. It is to be noted, however, that when Telephone A is answered, the power switch 107 is activated in the same manner as if the handset at Telephone A had been picked up to make a call. Accordingly, if the party at Telephone A dials the telephone number of Telephone B, the party at Telephone B will be added to the conversation via line 118, analog switches 140, 141 and demodulator 139. The party at Telephone B can also dial another party. Thus, a conference call between many parties can be achieved if the called party call someone else.

Figure 7:
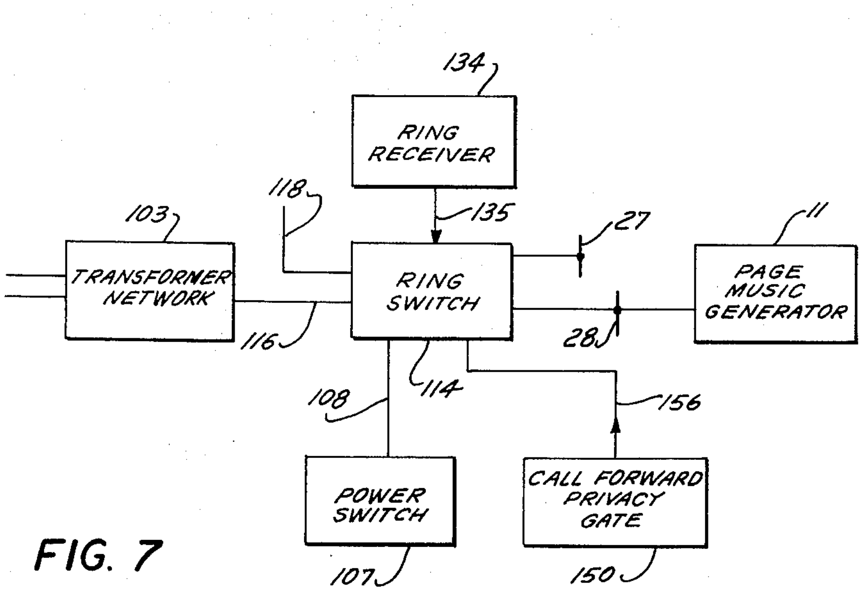
FIG. 7 is a block diagram of subsystems used to provide a public address or music to telephones otherwise not in use.

Referring to FIGS. 1 and 7, page music generator 11 provides audio signals on page-music line 28 which is connected, for example, to ring switch 114 on logic card $L_A$. Normally, the ring switch 114 connects page-music line 28 to line 116 and thereby provides a public address or music at Telephone A while its handset is in its cradle. However, if Telephone A is called, the ring receiver 134 provides a DC signal (logic 1) on line 135 which causes the ring switch 114 to disconnect the page music line 28 from line 116 and to connect ring line 27 to line 116. If the handset of Telephone A is removed from its cradle, line 108 connects voltage PS to the ring switch 114,and causes the page music line 28 to be disconnected from line 116,and connects line 116 to audio line 118. Further, during the "call intercept" function, the DC signal (logic 1) on the call forward privacy gate 150 is connected by line 156 to the ring switch 114 and causes the page music line 28 to be disconnected from line 116 and connects line 116 to audio line 118. Accordingly, a public address or music is only provided to the telephones in the system when they are otherwise not in use.

Each logic card $L_A$, $L_B$, $L_C$ . . . $L_F$ in the system includes a hold gate, which circuitwise is an inverter, a push to talk receiver and a hold receiver which, respectively, include a comparison circuit connected to a DC voltage producing pulse stretcher, and a push-to-talk gate which circuitwise is an AND gate.

Figure 8:
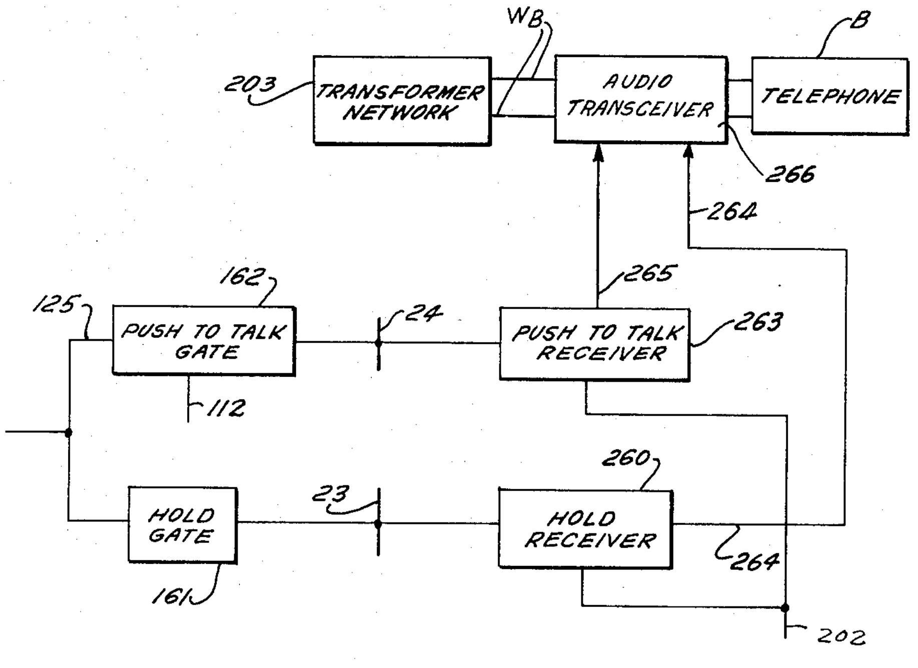
FIG. 8 is a block diagram of subsystems used to provide a "hands free" operation of a telephone.

Referring to FIG. 1 and 8, when, for example, Telephone A calls Telephone B, the signal $V'_{26}$ on line 125 is connected to the hold gate 161 where it is inverted and connected to hold line 23. Hold line 23 is connected to hold receiver 260 on logic card $L_B$. Line 202 connects signal $T_{26}$ to the hold receiver 260 and when both signals $T_{26}$ and inverted $V'_{26}$ are present at the hold receiver 260, it provides a DC signal on line 264.

In addition, signal $V'_{26}$ on line 125 is connected to push-to-talk gate 162, where it is inverted. When the call intercept button is depressed, the voltage $\overline{CI}$ on line 112 is also connected to the push-to-talk gate 162 and permits inverted signal $V'_{26}$ to be provided to push-to-talk line 24. Push-to-talk receiver 263, which is similar to hold receiver 260, is conected to push to talk line 24 and to line 202. Therefore, the push to talk receiver 263 only provides a DC signal on line 265 when the call intercept button is depressed.

The DC signal on line 264 and the DC signal on line 265 when the call intercept button is depressed, may be used as control signals for performing functions at a remote location. For example, the DC signals may be used to provide a "hands free" call at Telephone B.

A hands free operation at Telephone B is accomplished by connecting line 264 and 265 to audio transceiver 266. Audio transceiver 266 is connected to wires $W_B$ and is responsive to DC voltages on lines 264 and 265. The DC voltage on line 264 causes privacy to be maintained at Telephone B and the DC voltage on line 265 allows a party at Telephone B to talk when zero volts are present (logic 0) and allows a party at Telephone A to talk when a positive voltage (logic 1) is present. This arrangement allows a party at Telephone B to carry on a conversation without the need to hold the handset of telephone B in his hands.

The logic cards in this system include subsystems which enable a call to be made to one of a group of sequentially numbered telephones.

Figure 9:
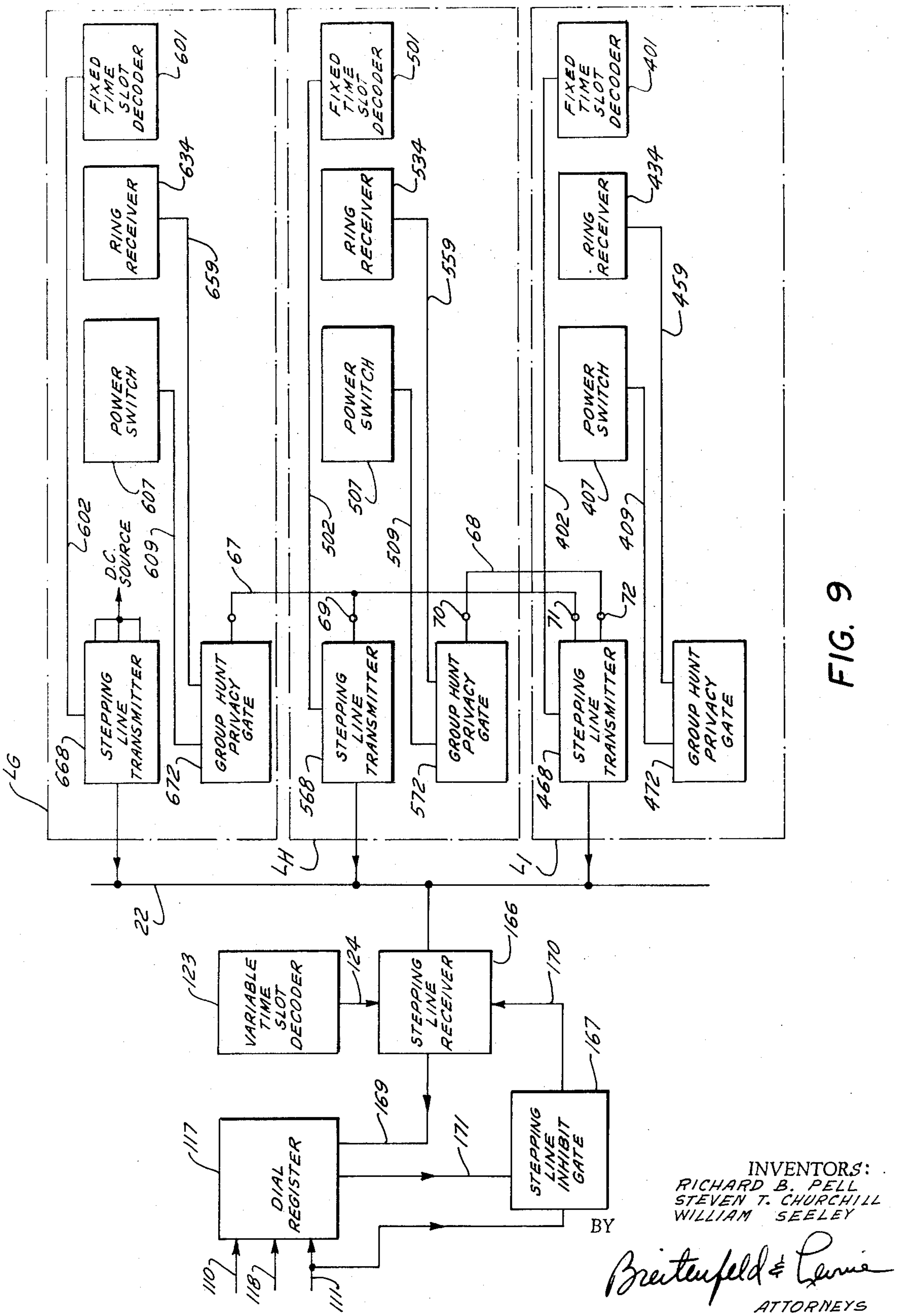
FIG. 9 is a block diagram of subsystems used to provide a "group hunt" function according to the invention.

In FIG. 9 there is shown subsystems on logic cards $L_G$, $L_H$ and $L_I$ which corresponding to Telephones G, H and I (not shown) respectively, having telephone numbers 99, 98 and 97 and comprising a group. In addition, FIG. 9 shows subsystems on logic card $L_A$ which are used when Telephone A calls one of a group telephone.

Assuming that Telephone H is in use, that logic cards $L_H$ and $L_I$ provides signals $T_{98}$ and $T_{97}$ to stepping line 22, and that Telephone A dials the number (97) of Telephone I, variable time slot decoder 123 provides $V_{97}$ to stepping line receiver 166. The stepping line receiver 166 is also connected to the stepping line 22 and provides an output pulse on line 169 in response to the simultaneous presence therein of signals $T_{97}$ and $V_{97}$. The output pulse on line 169 is connected to the dial register and causes the dialed number to increase by 1 to 98. Accordingly, the signal from the variable time slot decoder 123 to the stepping line receiver 166 changes to $V_{98}$. Signals $V_{98}$ and $T_{98}$ at the stepping line receiver 166 cause another pulse to be provided to the dial register 117 and its stored number is again increased by 1 so that the variable time slot decoder 123 provides signal $V_{99}$ to the stepping line receiver 166. Since the stepping line 22 does not provide a signal $T_{99}$, the dial register 117 does not experience a further shift.

When the handset of Telephone A was removed from its cradle, voltage $\overline{PPS}$ was connected by line 111 to a flip-flop circuit (not shown) in stepping line inhibit gate 167. The $\overline{PPS}$ voltage set the flip-flop and, via line 170 from the flip-flop, enabled the stepping line receiver 166. Simultaneously, the dial register 117, via line 171, provided a pulse to the stepping line inhibit gate 167 which is stretched therein for a period of time sufficient to allow the "redialing" to take place. The trailing edge of the stretched pulse resets the flip-flop and provides over line 170 a signal which disables the stepping line receiver 166.

The group hunt privacy gates 672, 572, 472, respectively, are connected to ring receivers 634, 534, 434 and to the voltage $\overline{PS}$ outputs of the power switches 607, 507, 407 on logic cards $L_G$, $L_H$, $L_I$. So long as Telephones G and H are not off-hook or ringing, their corresponding group hunt privacy gates 671, 572 provide a logic 0 to lines 67 and 68. Line 67 is connected to the inputs 69 and 71, respectively, of stepping line transmitters 568 and 468, and line 68 is connected to the input 72 of stepping line transmitter 468. So long as a logic 0 is on any input of a stepping line transmitter, the transmitter will couple its corresponding periodic signal $T_N$ to stepping line 22. Thus the arrangement described causes incoming calls to the group of telephones to be connected to the telephone having the highest number which is not in use.

It was initially stated that stepping line transmitter 668 did not provide a signal $T_{99}$. This is due to the fact that all of its inputs are connected to a logic 1, namely, a DC signal from a power supply (not shown).

Figure 10:
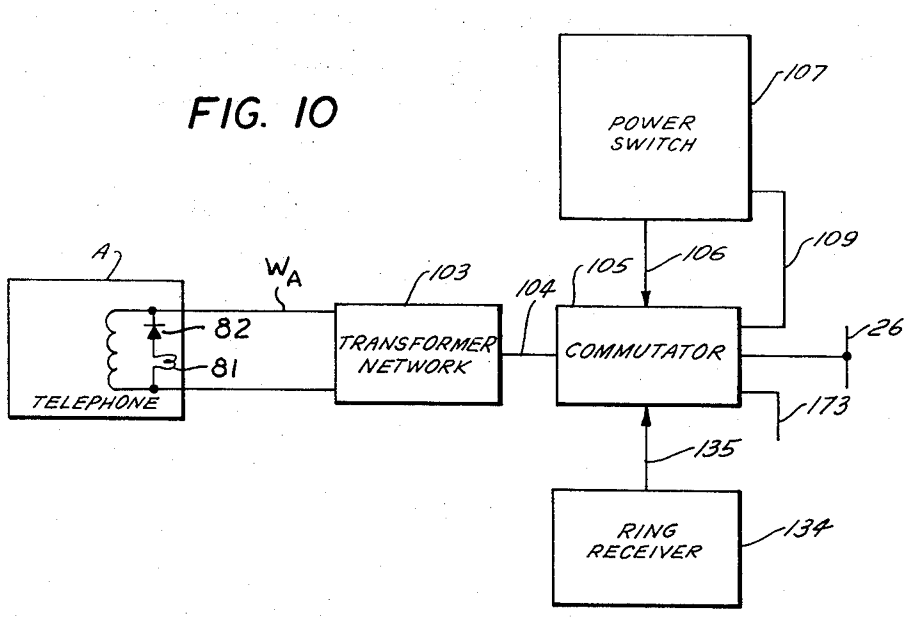
FIG. 10 is a block diagram of subsystems used according to the invention which cause a light to blink at a ringing telephone.

Referring to FIG. 10, Telephone A includes a signal lamp 81 and series diode 82 across wires $W_A$. Signal lamp 81 only lights when Telephone A is rung. This is achieved by connecting a positive voltage over line 106 to commutator 105 and by connecting a negative voltage via line 173 from a power supply (not shown) to the commutator 105 and by alternately connecting the positive and negative voltage from the commutator to the input winding of the transformer in transformer network 103. The negative voltage causes current to flow in the series diode 82 and signal lamp 81 circuit thereby giving off light.

Line 109 connects voltage $\overline{PS}$ to the commutator; line 135 connects the ring receiver to the commutator 105 and supplies a positive voltage when Telephone A is ringing, and line 26 connects positive pulses from the pulse light generator 15 to the commutator 105. When positive voltages are present on lines 109 and 135, the negative voltage is connected by the commutator 105 to the wires $W_A$. If zero volts are on any of lines 26, 109, or 135, the positive voltage is connected by the commutator to the wires $W_A$. Thus, if the handset of telephone A is removed from its cradle, or Telephone A is not ringing, the signal lamp 67 goes out.

Figure 11:
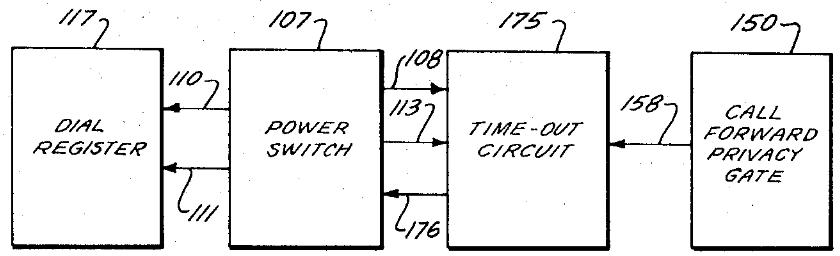
FIG. 11 is a block diagram of subsystems used according to the invention which cause a calling telephone to be disconnected from a called telephone.

Referring to FIG. 11, when the handset of Telephone A is removed from its cradle, voltage PS is connected by line 108 to time out circuit 175. This initiates a timing circuit which at the end of a fixed amount of time (e.g., 30 sec.) causes the time out circuit 175 to provide a signal over line 176 to the power switch 107. This signal causes the power switch to provide voltages PPS and $\overline{PPS}$ to the dial register, thereby terminating the ringing at the called telephone.

If the called telephone is picked up before the ringing is terminated, the call forward privacy gate 150 provides over line 158 a 0 logic signal which disables the time out circuit 175 until the handset of the called telephone is returned to its cradle. In the "call forward" mode, voltage $\overline{CF}$ is connected by line 113 to the time out circuit 175 and disables it so as not to disconnect Telephone A from the Telephone to which calls are forwarded.

Thus, Telephone A, (except for the call forward mode) is disconnected from a called telephone if the called party does not answer his telephone within a prescribed amount of time, or after a fixed amount of time after the called party hangs up.

The subsystems described heretofore are, as may be seen from the functional description herein, simple analog or digital circuits. For example, the link exchange network 126, the privacy switch 115, the privacy gate 122 and the ring disable receiver 137 will be more fully described herein below.

The link exchange network 126 either provides a signal $V'_N$ on line 146 or signals $V'_N$ and $T_{46}$, respectively, on lines 145 and 146, depending upon whether a logic 1 signal corresponding to the "call intercept" mode of operation, or a logic 0 signal, corresponding to the "executive override" mode of operation, is present on line 153.

Figure 12:
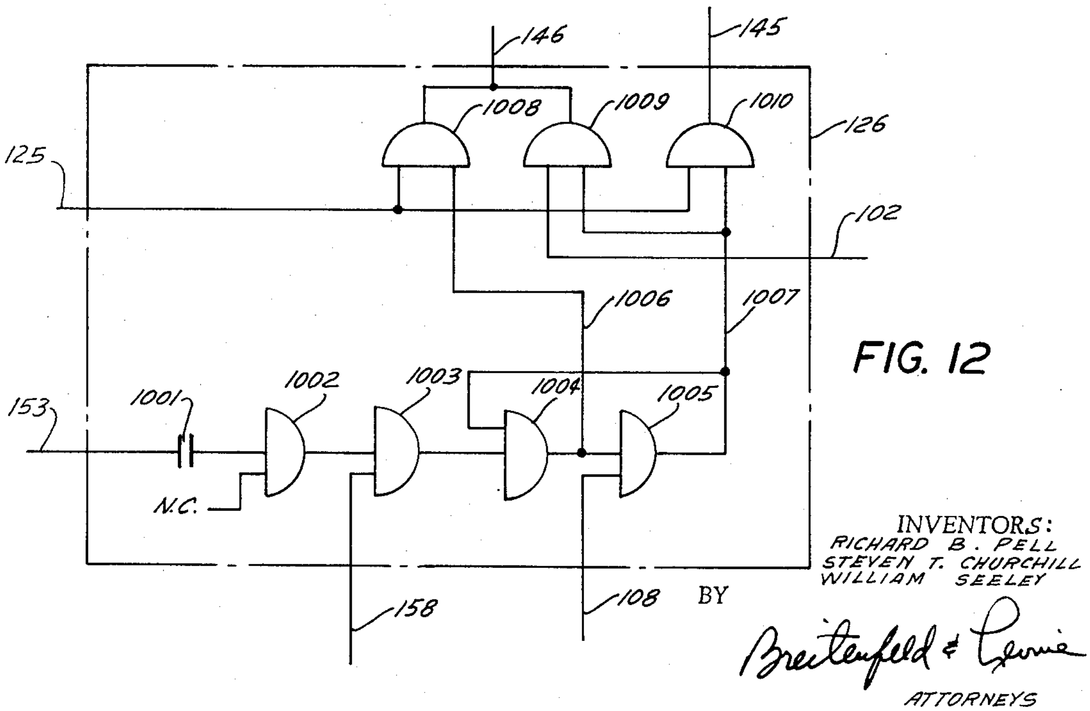
FIG. 12 is a schematic diagram of a link exchange network according to the invention.

Referring to FIGS. 5 and 12, when the $\overline{CI}$ button is depressed, a change from logic 1 to logic 0 on line 153 causes the differentiating network comprising capacitor 1001 and gate 1002 to provide a pulse to gate 1003. In the "call intercept" mode, a logic 1 signal is also applied to gate 1003 via line 158 and therefore, the pulse provided by gate 1003 is inverted and applied to an R-S flip-flop comprising gates 1004 and 1005. The inverted pulse resets the flip-flop and causes a logic signal to be applied to gate 1008 via line 1006 thereby coupling the $V_N$ signal on line 125 to line 146.

The voltage PS on line 108 sets the flip-flop when the handset of Telephone A is removed from its cradle. In the "executive override" mode, a logic 0 is applied to gate 1003 and the flip-flop remains set, thereby providing a logic 1 signal to gates 1009 and 1010 via line 1007. A logic 1 signal at gates 1009 and 1010 allows the gates, respectively, to couple signal $T_{46}$ one line 102 and signal $V'_N$ on line 125 to lines 146 and 145.

The function of the privacy switch 115 is to control the passage of an inverted signal $T_{46}$ out to privacy line 19 in order to incicate by its presence that Telephone A is not busy and by its absence that Telephone A is busy.

Referring to FIGS. 4, 5, 6, and 13, the fixed time slot decoder provides an inverted $T_{46}$ signal over line 102 to gate 1014. When Telephone A is not busy, this signal is coupled to privacy line 19 by gates 1014 and 1015. The presence of a logic 1 signal on either of lines 135 and 156, or both of lines 108 and 113, will cause a logic 0 to be applied to gate 1015 via line 1016 thereby inhibiting gate 1015 and depriving the privacy line 19 of a pulse signal.

Figure 13:
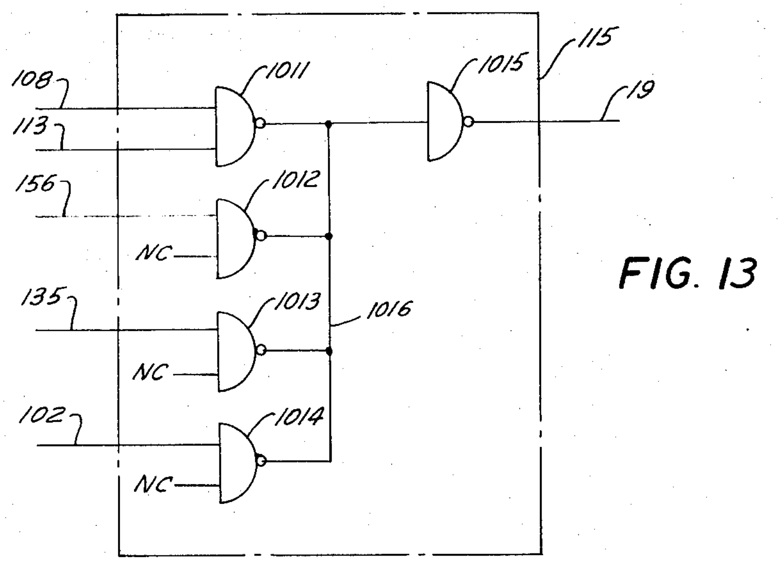
FIG. 13 is a schematic diagram of a privacy switch according to the invention.
Figure 14:
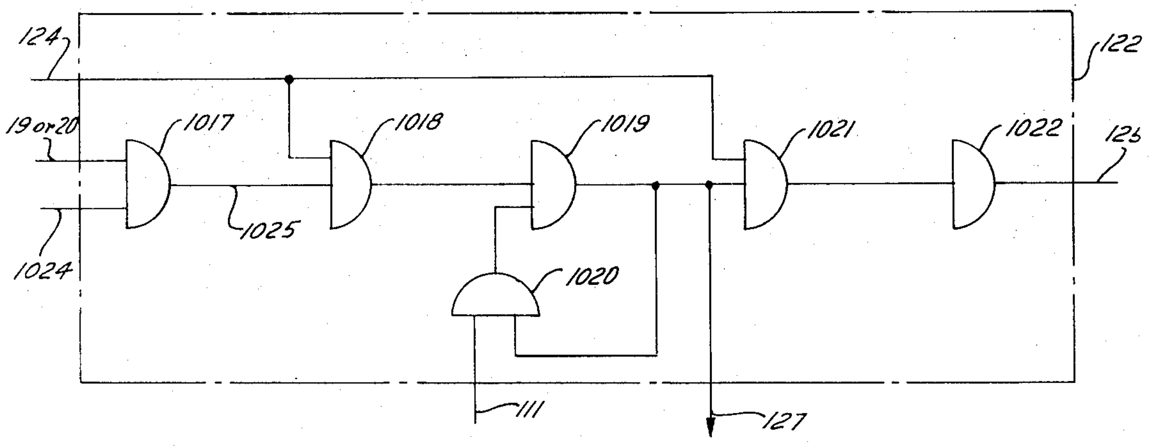
FIG. 14 is a schematic diagram of a privacy gate according to the invention.
Figure 15:
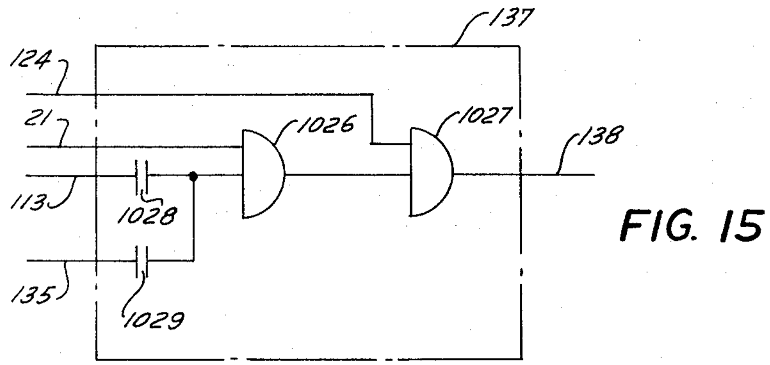
FIG. 15 is a schamatic diagram of a ring disable receiver according to the invention.

If it is decided that privacy during ringing is not desired, as with privacy switch 248, shown in FIG. 5, this may be achieved by removing gate 1013 from the circuit shown in FIG. 13.

The function of the privacy gate is to sense the presence of pulse on privacy lines 19 and 20 and to provide a signal $V'_N$ when pulses are present in its corresponding time slot.

Referring to FIG. 4, 5, 6, and 14 the output signal $V_N$ on line 124 from the variable time slot decoder 123 is connected to gate 1021 and transmitted via gate 1022 to line 125 only if inhibit line 127 provides a logic 1 to gate 1021. The line 127 is an output of a flip flop circuit, comprising gates 1019 and 1020, which is reset by voltage $\overline{PPS}$ on line 111 when the handset of Telephone A is picked up. When the flip-flop is reset, a logic 0 is applied to gate 1021 thereby preventing signal $V_N$ from being coupled to gate 1022.

When a D.C. voltage signal or voltage $\overline{CI}$ via line 112 is connected to line 1024, or a pulse signal $T_N$ from either privacy line 19 or 20 is connected to gate 1017, a pulse is provided on line 1025 to gate 1018. If the pulse signal on line 124 coincides with the pulse signal on line 1025, an output pulse is provided to gate 1019 which sets the flip-flop, thereby applying a logic 1 to gate 1021 and allowing $V'_N$ signals on to line 125.

Generally, the purpose of the ring disable receiver 137 is to receive signals from the ring disable lines 21 which are present during a particular time interval assigned to a called telephone. The presence of such signal is an indication that the called party has picked up his telephone and that ring tone should be terminated.

Therefore, the output 138 of the ring disable receiver 137 is applied to the ring gate 121 of Telephone A to inhibit its operation.

Referring to FIG. 4, 5, 6, and 15, this is achieved by connecting the signals on ring disable line 21 to gate 1026 where they are inverted and applied to gate 1027. If the signal $V_N$ from the variable time slot decoder 123 on line 124 and the inverted signal have pulses which occur at the same time, gate 1027 will provide an output signal on line 138. Further, a negative step voltage provided by either line 113 or line 135 causes a positive pulse to be applied to gate 1027 which lasts for more than a clock cycle thereby allowing a pulse to be transmitted to line 138 when the call forward button is depressed or when the ring receiver output on line 135 drops to a logic 0.

It is to be understood that the description herein of a preferred embodiment according to the invention is set forth as an example thereof and is not to be construed or interpreted as a limitation on the claims which follow and define the invention.

What is claimed is:

1. A telephone communications system comprising:

a plurality of telephones each of which originates and receives calls, and each of which includes a variable resistive load;

a time division, amplitude modulated, multiplexed transmitting and receiving means for transmitting and receiving calls;

electrical conductor means coupling each of said plurality of telephones to said time multiplexed transmitting and receiving means;

means forming part of said transmitting and receiving means for supplying a D.C. voltage to each of said plurality of telephones via its respective conductor means; and means responsive to the current drawn by each of said plurality of telephones for routing calls for a first of said plurality of telephones to a second of said plurality of telephones.

2. A telephone communications system as defined in claim 1 wherein said time multiplexed transmitting and receiving means includes means for terminating an unanswered call from said first of said plurality of telephones to any other of said plurality of telephones after a predetermined time interval.

3. A telephone communications system as defined in claim 1, further including means for providing paging or music signals to said first of said plurality of telephones via its corresponding conductor means.

4. A telephone communications systems as defined in claim 1, further including a light source coupled to said conductor means, and wherein said time multiplexed transmitting and receiving means includes means coupled to said conductor means for lighting said light source.

5. A telephone communications system as defined in claim 1, further including an audio transceiver coupled to said conductor means, and wherein said time multiplexed transmitting and receiving means includes means responsive to the current drawn by a second of said plurality of telephones for controlling audio signal traffic at said audio transceiver.

6. A telephone communications system as defined in claim 1, wherein said plurality of telephones includes a group of telephones, and said time multiplexed transmitting and receiving means includes means for directing a call from said first of said plurality of telephones to any one of said group of telephones which is not receiving a call.

7. A telephone communications system as defined in claim 1, wherein said routing means includes means for routing a call from a first of said plurality of telephones, directed to a second of said plurality of telephones, to a third of said plurality of telephones.

8. A telephone communications system as defined in claim 7 wherein said time multiplexed transmitting and receiving means includes means for terminating an unanswered call from said first of said plurality of telephones to any other of said plurality of telephones after a predetermined time interval.

9. A telephone communications system as defined in claim 7, further including means for providing paging or music signals to said first of said plurality of telephones via its corresponding conductor means.

10. A telephone communications system as defined in claim 7, further including a light source coupled to said conductor means, and wherein said time multiplexed transmitting and receiving means includes means coupled to said conductor means for lighting said light source.

11. A telephone communications system as defined in claim 7, further including an audio transceiver coupled to said conductor means, and wherein said time multiplexed transmitting and receiving means includes means responsive to the current drawn by a second of said plurality of telephones for controlling audio signal traffic at said audio transceiver.

12. A telephone communications system as defined in claim 7, wherein said plurality of telephones includes a group of telephones, and wherein said time multiplexed transmitting and receiving means includes means for directing a call from said first of said plurality of telephones to any one of said group of telephones which is not receiving a call.

13. A telephone communications system as defined in claim 12, further including means for providing paging or music signals to said first of said plurality of telephones via its corresponding pair of wires.

14. A telephone communications system as defined in claim 12, wherein said time multiplexed transmitting and receiving means includes means for terminating an unanswered call from said first of said plurality of telephones to any other of said plurality of telephones, after a predetermined time interval.

15. A transceiver for a time-multiplexed sampled data telephone system, comprising:

a first audio line;

a second audio line;

a telephone for transmitting and receiving electrical signals;

a pair of wires coupled to said telephone;

means for providing a first periodic pulse signal, in a variable time slot, coupled to said pair of wires;

means for providing a second periodic pulse signal in a predetermined time slot;

first pulse responsive means coupling said first audio line to said pair of wires;

first and second demodulators coupled to said pair of wires;

second pulse responsive means coupling said second audio line to said first demodulator;

third pulse responsive means coupling said second audio line to said pair of wires;

fourth pulse responsive means coupling said first audio line to said second demodulator; and means for selectively coupling said first periodic pulse signal to said third and fourth pulse responsive means or coupling said first periodic pulse signal to said first and second pulse responsive means and said second periodic pulse signal to said third and fourth pulse responsive means.

16. A transceiver as defined in claim 15, including:

a busy signal generator; and means coupling said busy signal generator to said pair of wires.

17. A transceiver as defined in claim 16, wherein said means coupling said busy signal generator to said pair of wires includes:

a busy switch;

a busy gate coupled to said busy switch;

a power switch coupled to said busy gate and to said privacy switch; and a privacy line coupled to said privacy gate.

18. A transceiver as defined in claim 15, including:

a ring tone generator; and means coupling said ring tone generator to said pair of wires.

19. A transceiver as defined in claim 18, wherein said means coupling said ring tone generator to said pair of wires includes:

a ring control line;

a ring receiver coupled to said ring control line and to said means for providing a second periodic pulse signal;

a ring switch coupled to said ring tone generator and to said ring receiver; and a transformer coupling said ring switch to said pair of wires.

20. A transceiver as defined in claim 15 including:

a bleep tone generator; and means coupling bleep tone generator to said pair of wires.

21. A transceiver as defined in claim 20, wherein said means coupling said bleep tone generator to said pair of wires includes:

a power switch;

a call intercept latch coupled to said power switch;

a bleep network coupled to said call intercept latch and said bleep tone generator;

a ring switch coupled to said bleep network and said power switch; and a transformer network coupling said ring switch to said pair of wires.

22. A transceiver as defined in claim 15 including:

a paging and music signal generator; and means coupling said paging and music signal generator to said pair of wires.

23. A transceiver as defined in claim 22, wherein said means coupling said page-music generator to said pair of wires includes:

a ring coupled to said page-music generator;

a power switch coupled to said ring switch; and a transformer network coupling said ring switch to said pair of wires.

24. A transceiver as defined in claim 23, including:

a busy signal generator;

means coupling said busy signal generator to said pair of wires;

a ring tone generator;

means coupling said ring tone generator to said pair of wires;

a bleep tone generator;

ameans coupling said bleep tone generator to said pair of wires;

a light pulse generator;

a light bulb coupled to said pair of wires; and means coupling said light pulse generator to said pair of wires.

* * * * *